United States Patent
Colson et al.

(10) Patent No.: US 12,521,951 B2
(45) Date of Patent: Jan. 13, 2026

(54) TIRE MOLD AND METHOD FOR TIRE MANUFACTURING

(71) Applicant: The Goodyear Tire & Rubber Company, Akron, OH (US)

(72) Inventors: Didier Pol Colson, Vaux-sur-Sure (BE); Fabrice Gabriele, Aywaille (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 112 days.

(21) Appl. No.: 18/359,481

(22) Filed: Jul. 26, 2023

(65) Prior Publication Data

US 2025/0033304 A1    Jan. 30, 2025

(51) Int. Cl.
*B29D 30/06* (2006.01)
*B29D 30/02* (2006.01)
*B29D 30/72* (2006.01)

(52) U.S. Cl.
CPC ......... *B29D 30/02* (2013.01); *B29D 30/0606* (2013.01); *B29D 2030/0612* (2013.01); *B29D 2030/726* (2013.01)

(58) Field of Classification Search
CPC ........ B29D 30/0606; B29D 2030/0612; B29D 2030/726; B29C 33/306; B29C 33/424; B29C 33/428
See application file for complete search history.

(56) References Cited

FOREIGN PATENT DOCUMENTS

| JP | 2015051605 A | * | 3/2015 | ............. B29C 33/02 |
| JP | 2020185757 A | * | 11/2020 | ........... B29C 33/424 |
| WO | WO-2017217943 A1 | * | 12/2017 | ........... B29C 33/306 |

* cited by examiner

*Primary Examiner* — Justin R Fischer
*Assistant Examiner* — Philip N Schwartz
(74) *Attorney, Agent, or Firm* — Katherine A. Smith

(57) ABSTRACT

The present invention relates to a tire mold for manufacturing at least one pneumatic tire. The present invention further relates to a method of manufacturing a tire mold. The present invention further relates to a molding kit comprising the tire mold. The present invention further relates to a tire cured in a tire mold.

14 Claims, 2 Drawing Sheets

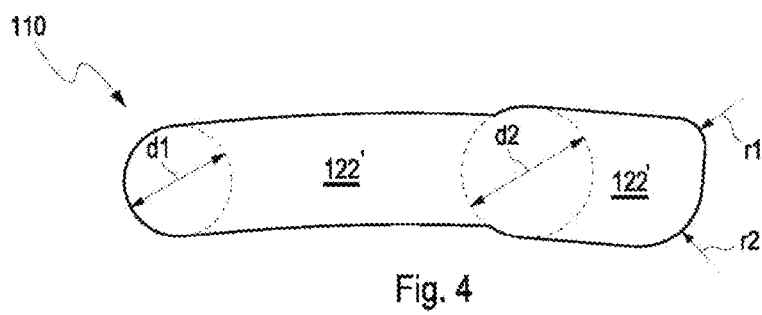
Fig. 4
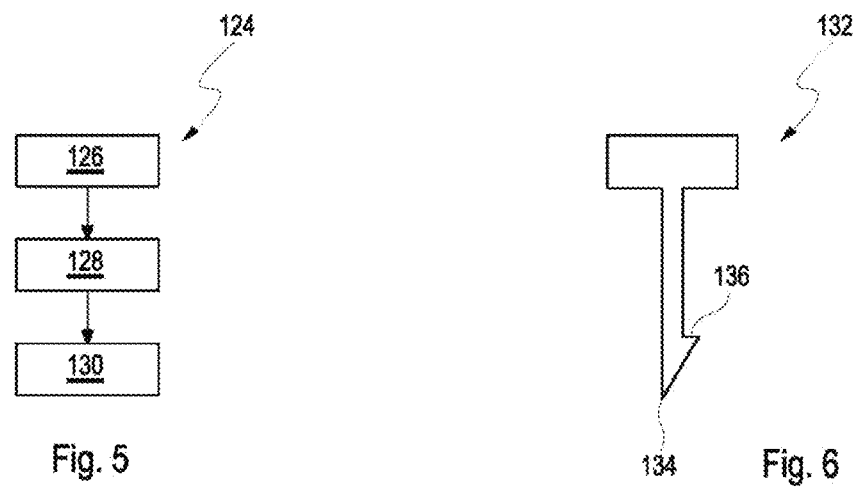
Fig. 5
Fig. 6
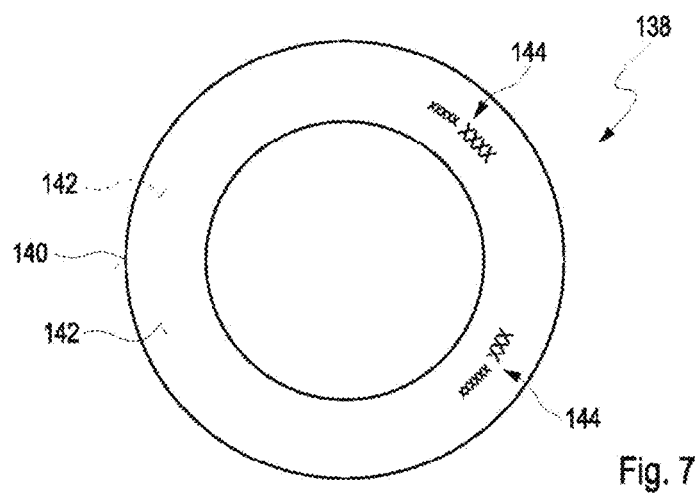
Fig. 7

TIRE MOLD AND METHOD FOR TIRE MANUFACTURING

CROSS-REFERENCE TO RELATED APPLICATIONS

The present invention relates to a tire mold for manufacturing at least one pneumatic tire. The present invention further relates to a method of manufacturing a tire mold, to a molding kit comprising the tire mold and to a tire cured in a tire mold. Such a tire mold is of particular value for manufacturing pneumatic tires, such as tires for passenger vehicles, e.g. for cars, trucks, buses, coaches and the like.

BACKGROUND OF THE INVENTION

In pneumatic tires are used on vehicles throughout every country in the world. Thus, tires not only have to fulfill different physical standards for many different countries, but are also required to have technical markings such as serial numbers or information on running direction and permissible pressure load, according to the respective country's requirements. In an effort to manufacture tires for numerous different countries, there is a long felt need for simplifying the exchange of marking or label forming parts of tire molds. Therefore, there is a need to provide an easily assemblable tire mold for use in tire production.

SUMMARY OF THE INVENTION

Therefore, the present invention relates to a tire mold for manufacturing at least one pneumatic tire, the tire mold comprising
  an annular base part comprising two or more recesses,
    wherein a first recess of the two or more recesses has a first recess shape S1 and
    wherein a second recess of the two or more recesses has a second recess shape S1' different from the first recess shape S1, and
  two or more plaques,
    wherein a first plaque of the two or more plaques has a first plaque shape S2 comprising a negative shape of the first recess shape S1, such that the first plaque is insertable into the first recess of the base part,
    wherein a second plaque of the two or more plaques has a second plaque shape S2' comprising a negative shape of the second recess shape S1', such that the second plaque is insertable into the second recess,
  wherein at least one of the two or more recess shapes is asymmetric to a plane spanned by the central axis of the annular base part and a straight line perpendicular to the central axis through the geometric center point of the at least one of the two or more recess shapes.

Furthermore, the present invention relates to a method of manufacturing a tire mold, the method comprising the following steps:
  a) providing an annular base part comprising two or more recesses, wherein a first recess of the two or more recesses has a first recess shape S1 and a second recess of the two or more recesses has a second recess shape S1' different from the first recess shape S1, wherein at least one of the two or more recess shapes is asymmetric to a plane spanned by the central axis of the annular base part and a straight line perpendicular to the central axis through the geometric center point of the at least one of the two or more recess shapes;
  b) providing two or more plaques, wherein a first plaque of the two or more plaques has a first plaque shape S2 comprising a negative shape of the first recess shape S1, wherein a second plaque of the two or more plaques has a second plaque shape S2' comprising a negative shape of the second recess shape S1';
  c) inserting the two or more plaques into their respective recesses of the base part.

Furthermore, the present invention relates to a molding kit comprising at least one tire mold according to the present invention, at least one additional plaque, and at least one plaque removing instrument for removing the plaques from the annular base part.

Furthermore, the present invention relates to a tire cured in a tire mold according to the present invention.

Definitions

In the context of the present invention, the expression "annular base part" refers to a part providing a form and/or shape to a rim of a tire. The annular base part may also be referred to as "mold plate" and/or "sidewall ring plate".

In the context of the present invention, the expression "shape" means a three-dimensional geometric form.

In the context of the present invention, the expression "plaque" refers to a flat, thin metal part, for example to a sheet metal cutout. The plaque may also be referred to as "plate" and/or "badge" and/or "slug".

BRIEF DESCRIPTION OF DRAWINGS

The invention will be described by way of example and with reference to the accompanying drawings which:
FIG. 4 is an enlarged front plane view of the plaque of a preferred embodiment of the tire mold according to the present invention;
FIG. 5 is a flow chart of the method of manufacturing a tire mold according to the present invention;
FIG. 6 is an enlarged front plane view of the plaque removing instrument of a preferred embodiment of the molding kit according to the present invention;
FIG. 7 is a front plane view of a preferred embodiment of a tire cured in a tire mold according to the present invention.

DETAILED DESCRIPTION OF THE INVENTION

Figure 1:
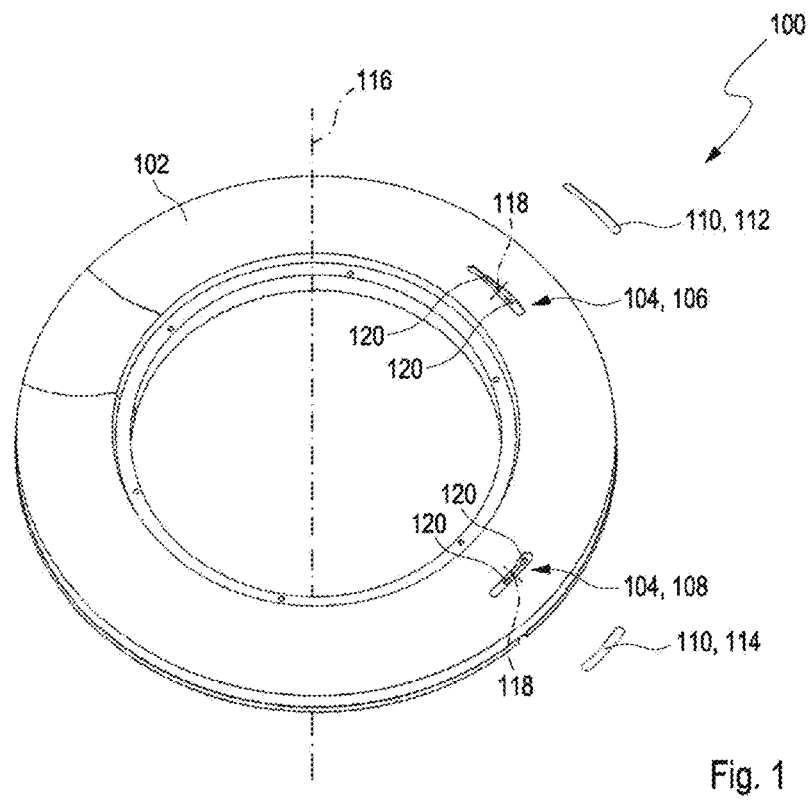
FIG. 1 is a perspective view of a preferred embodiment of the tire mold according to the present invention.

The present invention relates to a tire mold for manufacturing at least one pneumatic tire, the tire mold comprising
  an annular base part comprising two or more recesses,
    wherein a first recess of the two or more recesses has a first recess shape S1 and
    wherein a second recess of the two or more recesses has a second recess shape S1' different from the first recess shape S1, and
  two or more plaques,
    wherein a first plaque of the two or more plaques has a first plaque shape S2 comprising a negative shape of the first recess shape S1, such that the first plaque is insertable into the first recess of the base part, wherein a second plaque of the two or more plaques has a second plaque shape S2' comprising a negative shape of the second recess shape S1', such that the second plaque is insertable into the second recess, wherein at least one of the two or more recess shapes is asymmetric to a plane spanned by the central axis of the annular base part and a straight line perpendicular to the central axis through the geometric center point of the at least one of the two or more recess shapes.

Preferably, the at least one of the two or more recess shapes is further asymmetric in a plane through the geometric center point of the at least one of the two or more recess shapes and whose normal vector points along the straight line perpendicular to the central axis through the geometric center point.

Preferably, the number of the plaques equals the number of the recesses of the base part.

Preferably, the recess shapes of all of the two or more recess shapes differ from each other. In other words, preferably, each recess shape is unique.

Preferably, each of the two or more recesses forms a one-to-one pairing with one of the two or more plaques.

Preferably, only in the pairing, the plaque shape and the recess shape are negatives of each other.

Preferably, at least one of the two or more recess shapes comprises a geometry composed of at least one hole and a long hole or of at least two long holes, wherein the holes all have different hole diameters. More preferably, all recess shapes comprise a geometry composed of at least one hole and a long hole or of at least two long holes, wherein the holes all have different hole diameters. More preferably, at least one of the two or more recess shapes, preferably all recess shapes, comprises a geometry composed of three long holes, wherein at least two of the holes, preferably all of the three holes, have different hole diameters. More preferably, the long holes, additionally to having different diameters, have at least one radius on an outer edge of the recess shape that differs from ½ of the hole diameters of the holes.

Preferably, the long holes are arched long holes. In other words, preferably, the long holes are long holes following a curvature.

Preferably, the long holes follow a curvature of the annular base part. Preferably, the long holes follow a curvature depending on a radius of the annular base part and on a position of the long holes on the annular base part. Preferably, the long holes follow a curvature depending on a distance of the long holes from the central axis of the annular base part.

Preferably, the volume of each of the plaques is bigger than the volume of the recess the plaque is insertable into. Preferably, the volume of each of the plaques is bigger than the volume of the recess the plaque is insertable into for creating a tight fit. Preferably, the fitting of the plaques is tight within the recesses. More preferably, the plaques are manufactured to have an oversize, i.e. being larger than specified, while the recesses are manufactured to have an undersize, i.e. being smaller than specified. More preferably, the plaques have tolerances in the range of from −0.06 mm to +0.11 mm. More preferably, the plaques have tolerances in the range of from −0.05 mm to +0.1 mm. More preferably, the plaques have a tolerance in length in the range of from 0 mm to +0.05 mm, a tolerance in height of from +0.05 mm to +0.1 mm and a tolerance in depth of from −0.05 mm to 0 mm. More preferably, the tolerances are manufacturing tolerances. More preferably, the recesses have tolerances in the range of from −0.06 mm to +0.06 mm. More preferably, the recesses have tolerances in the range of from −0.05 mm to +0.05 mm. More preferably, the recesses have a tolerance in lengths in the range of from −0.05 mm to 0 mm, a tolerance in height of from −0.05 mm to 0 mm and a tolerance in depth of from 0 mm to +0.05 mm.

Preferably, the volume of each of the plaques is such that, when inserted into the recess of the base part, the plaque is within a clear dimension of the base part.

Preferably, the base part comprises one or more materials selected from the group consisting of steel, aluminum, copper and one or more of their alloys. More preferably, the base part comprises one or more materials selected from the group consisting of steel, aluminum and one or more of their alloys.

Preferably, at least one of the two or more plaques comprises one or more material selected from the group consisting of steel, aluminum, copper and one or more of their alloys. More preferably, the at least one of the two or more plaques comprises one or more materials selected from the group consisting of steel, aluminum and one or more of their alloys.

Preferably, the tire mold comprises at least 3 plaques and at least 3 recesses in the base part. More preferably, the tire mold comprises at least 5 plaques and at least 5 recesses in the base part. More preferably, the tire mold comprises at least 10 plaques and at least 10 recesses in the base part. More preferably, the tire mold comprises at least 12 plaques and at least 12 recesses in the base part.

Preferably, in each recess, the base part comprises one or more extracting holes. Preferably, in each recess, the base part comprises one or more extracting holes for extracting the plaque from the recess, preferably in a later stage, after the plaque is inserted into the recess and the plaque is to be exchanged. Preferably, the recesses comprise one extracting hole per long hole. In other words, preferably, in case the recess comprises one long hole, the recess further comprises one extracting hole, wherein in case the recess comprises two long holes, the recess further comprises two extracting holes and wherein in case the recess comprises three long holes, the recess further comprises three extracting holes.

The present invention further relates to a method of manufacturing a tire mold, the method comprising the following steps:

a) providing an annular base part comprising two or more recesses, wherein a first recess of the two or more recesses has a first recess shape S1 and a second recess of the two or more recesses has a second recess shape S1' different from the first recess shape S1, wherein at least one of the two or more recess shapes is asymmetric to a plane spanned by the central axis of the annular base part and a straight line perpendicular to the central axis through the geometric center point of the at least one of the two or more recess shapes;

b) providing two or more plaques, wherein a first plaque of the two or more plaques has a first plaque shape S2 comprising a negative shape of the first recess shape S1, wherein a second plaque of the two or more plaques has a second plaque shape S2' comprising a negative shape of the second recess shape S1';

c) inserting the two or more plaques into their respective recesses of the base part;

Preferably, in step c) of the method of manufacturing, each of the two or more plaques are inserted into the respective recess having their negative shape.

Preferably, step c) is performed by using an insertion tool. Preferably, the insertion tool has a flat insertion area to be placed on the plaque and then, preferably by using a hammer, to push the plaque in its respective recess.

Preferably, the plaques as provided in step b) are bent before the insertion according to step c), preferably to facilitate the insertion, wherein the insertion tool is used to flatten the plaques within their respective recesses. More preferably, in step c) the insertion tool is placed with its flat insertion area on the plaque and then, preferably by using a hammer, is pushed onto the plaque, thereby preferably flattening the plaque in its respective recess.

Preferably, the insertion tool comprises a plastic material. More preferably, the insertion tool comprises a polyamide material.

Preferably, the method of manufacturing a tire mold is configured for manufacturing a tire mold according to the present invention.

The present invention further relates to a molding kit comprising
- at least one tire mold according to the present invention,
- at least one additional plaque,
- at least one plaque removing instrument for removing the plaques from the annular base part.

Preferably, the molding kit comprises the at least one additional plaque as a spare part. More preferably, the molding kit comprises a plurality of spare plaques.

Preferably, the molding kit comprises the at least one plaque removing instrument for removing the plaques from the annular base part after using the tire mold for molding at least one tire.

The present invention further relates to a tire cured in a tire mold according to the present invention, the tire having a tread and a pair of sidewalls, wherein at least one sidewall comprises markings generated by the plaques of the tire mold.

Preferably, the tire cured in a tire mold according to the present invention is a pneumatic tire.

The present invention is further illustrated by the following set of embodiments and combinations of embodiments resulting from the dependencies and back-references as indicated. In particular, it is noted that in each instance where a range of embodiments is mentioned, for example in the context of a term such as "The tire mold of any one of embodiments 1 to 3", every embodiment in this range is meant to be explicitly disclosed for the skilled person, i.e. the wording of this term is to be understood by the skilled person as being synonymous to "The tire mold of any one of embodiments 1, 2 and 3". Further, it is explicitly noted that the following set of embodiments represents a suitably structured part of the general description directed to preferred aspects of the present invention, and, thus, suitably supports, but does not represent the claims of the present invention.

According to embodiment 1 of the present invention relating to a tire mold for manufacturing at least one pneumatic tire, the tire mold comprises
- an annular base part comprising two or more recesses,
  - wherein a first recess of the two or more recesses has a first recess shape S1 and
  - wherein a second recess of the two or more recesses has a second recess shape S1' different from the first recess shape S1, and
- two or more plaques,
  - wherein a first plaque of the two or more plaques has a first plaque shape S2 comprising a negative shape of the first recess shape S1, such that the first plaque is insertable into the first recess of the base part,
  - wherein a second plaque of the two or more plaques has a second plaque shape S2' comprising a negative shape of the second recess shape S1', such that the second e plaque is insertable into the second recess,
- wherein at least one of the two or more recess shapes is asymmetric to a plane spanned by the central axis of the annular base part and a straight line perpendicular to the central axis through the geometric center point of the at least one of the two or more recess shapes.

Embodiment 2: The tire mold according to embodiment 1, wherein the at least one of the two or more recess shapes is further asymmetric in a plane through the geometric center point of the at least one of the two or more recess shapes and whose normal vector points along the straight line perpendicular to the central axis through the geometric center point.

Embodiment 3: The tire mold according to embodiment 1, wherein the number of the plaques equals the number of the recesses of the base part.

Embodiment 4: The tire mold according to embodiment 1, wherein the recess shapes of all of the two or more recess shapes differ from each other, preferably each recess shape is unique.

Embodiment 5: The tire mold according to embodiment 1, wherein each of the two or more recesses forms a one-to-one pairing with one of the two or more plaques.

Embodiment 6: The tire mold according to embodiment 5, wherein only in the pairing, the plaque shape and the recess shape are negatives of each other.

Embodiment 7: The tire mold according to embodiment 1, wherein at least one of the two or more recess shapes, preferably all recess shapes, comprises a geometry composed of at least one hole and a long hole or of at least two long holes, wherein the holes all have different hole diameters, more preferably the long holes, additionally to having different diameters, have at least one radius on an outer edge of the recess shape that differs from ½ of the hole diameters of the holes.

Embodiment 8: The tire mold according to embodiment 7, wherein the long holes are arched long holes, preferably the long holes follow a curvature.

Embodiment 9: The tire mold according to embodiment 7, wherein the long holes follow a curvature of the annular base part.

Embodiment 10: The tire mold according to embodiment 1, wherein the volume of each of the plaques is bigger than the volume of the recess the plaque is insertable into, preferably for creating a tight fit.

Embodiment 11: The tire mold according to embodiment 1, wherein the volume of each of the plaques is such that, when inserted into the recess of the base part, the plaque is within a clear dimension of the base part.

Embodiment 12: The tire mold according to embodiment 1, wherein the base part comprises one or more materials selected from the group consisting of steel, aluminum, copper and one or more of their alloys, preferably the base part comprises one or more materials selected from the group consisting of steel, aluminum and one or more of their alloys.

Embodiment 13: The tire mold according to embodiment 1, wherein at least one of the two or more plaques comprises one or more materials selected from the group consisting of steel, aluminum, copper and one or more of their alloys, preferably the at least one of the two or more plaques comprises one or more materials selected from the group consisting of steel, aluminum and one or more of their alloys.

Embodiment 14: The tire mold according to embodiment 1, wherein the tire mold comprises at least 3, preferably at least 5, more preferably at least 10, even more preferably at least 12, plaques and at least 3, preferably at least 5, more preferably at least 10, even more preferably at least 12, recesses in the base part.

Embodiment 15: The tire mold according to embodiment 1, wherein in each recess, the base part comprises one or more extracting holes.

Embodiment 16: A method of manufacturing a tire mold, the method comprising the following steps:
a) providing an annular base part comprising two or more recesses, wherein a first recess of the two or more recesses has a first recess shape S1 and a second recess of the two or more recesses has a second recess shape S1' different from the first recess shape S1, wherein at least one of the two or more recess shapes is asymmetric to a plane spanned by the central axis of the annular base part and a straight line perpendicular to the central axis through the geometric center point of the at least one of the two or more recess shapes;
b) providing two or more plaques, wherein a first plaque of the two or more plaques has a first plaque shape S2 comprising a negative shape of the first recess shape S1, wherein a second plaque of the two or more plaques has a second plaque shape S2' comprising a negative shape of the second recess shape S1';
c) inserting the two or more plaques into their respective recesses, preferably into the respective recess having their negative shape, of the base part.

Embodiment 17: The method of manufacturing a tire mold according to embodiment 16, wherein step c) is performed by using an insertion tool, preferably having a flat insertion area to be placed on the plaque and, preferably by using a hammer, to push the plaque in its recess.

Embodiment 18: The method according to embodiment 17, wherein the plaques provided in step b) are bent before the insertion according to step c), wherein the insertion tool is used to flatten the plaques within their respective recesses, wherein more preferably in step c) the insertion tool is placed with its flat insertion area on the plaque and, preferably by using the hammer, is pushed onto the plaque, thereby preferably flattening the plaque in its recess.

Embodiment 19: The method according to embodiment 16, wherein the insertion tool comprises a plastic material, preferably a polyamide material.

Embodiment 20: A molding kit comprising
at least one tire mold according to embodiment 1,
at least one additional plaque, i.e. as a spare part, preferably a plurality of spare plaques,
at least one plaque removing instrument for removing the plaques from the annular base part, preferably after using the tire mold for molding at least one tire.

Embodiment 21: A tire cured in a tire mold according to embodiment 1, the tire having a tread and a pair of sidewalls, wherein at least one sidewall comprises markings generated by the plaques of the tire mold.

FIG. 1 is a perspective view of a preferred embodiment of the tire mold 100 according to the present invention. In particular, the tire mold 100 is configured for manufacturing at least one pneumatic tire and comprises an annular base part 102. The annular base part 102 comprises two or more recesses 104, wherein a first recess 106 of the two or more recesses 104 has a first recess shape S1 and wherein a second recess 108 of the two or more recesses 104 has a second recess shape S1', different from the recess shape S1. The tire mold 100 further comprises two or more plaques 110. A first plaque 112 of the two or more plaques 110 has a first plaque shape S2 comprising a negative shape of the first recess shape S1, such that the first plaque 112 is insertable into the first recess 106 of the base part 102. A second plaque 114 of the two or more plaques 110 has a second plaque shape S2' comprising a negative shape of the second recess shape S1', such that the second e plaque 114 is insertable into the second recess 108. At least one of the two or more recess shapes is asymmetric to a plane spanned by the central axis 116 of the annular base part 102 and a straight line perpendicular to the central axis 116 through the geometric center point 118 of the at least one of the two or more recess shapes.

Optionally, the at least one of the two or more recess shapes may further be asymmetric in a plane through the geometric center point 118 of the at least one of the two or more recess shapes and whose normal vector points along the straight line perpendicular to the central axis 116 through the geometric center point 118.

Further, optionally, in each recess 104 the base part 102 may comprise one or more extracting holes 120. In FIG. 1, exemplarily, two extracting holes 120 in each recess 104 are illustrated.

Figure 2:
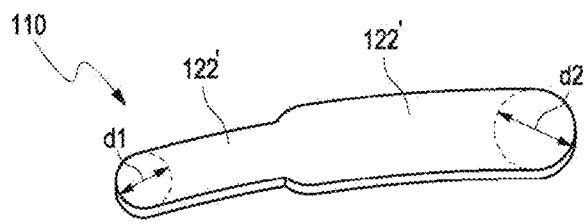
FIG. 2 is an enlarged perspective view of the plaque of a preferred embodiment of the tire mold according to the present invention.
Figure 3:
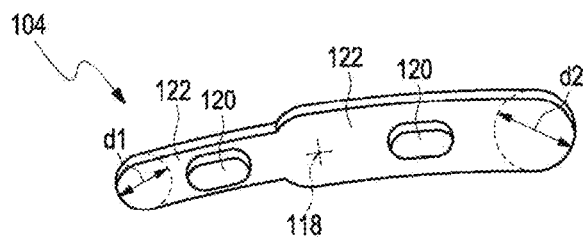
FIG. 3 is an enlarged perspective view of the recess of a preferred embodiment of the tire mold according to the present invention.

FIG. 2 is an enlarged perspective view of the plaque 110 of a preferred embodiment of the tire mold 100 according to the present invention and FIG. 3 is an enlarged perspective view of the recess 104 of a preferred embodiment of the tire mold 100 according to the present invention. The plaque 110 and the recess 104 illustrated in FIG. 2 and FIG. 3 form a one-to-one pairing with each other. In this pairing, the shape of the plaque 110, i.e. the plaque shape, and the shape of the recess 104, i.e. the recess shape, are negatives of each other. The recess 104 and the plaque 110 comprise a geometry composed of two long holes 122 and two long parts 122', respectively, wherein the long holes 122 and the long parts 122' have different diameters d1 and d2. Optionally, the long holes 122 and the long parts 122' may be arched long holes 122 and arched parts 122', respectively, following a curvature of the annular base part 102. Preferably, a volume of the plaque 110 may be bigger than a volume of the recess 104, such that a tight fit is created when the plaque 110 is inserted into the recess 104.

FIG. 4 is an enlarged perspective view of the plaque 110 of another preferred embodiment of the tire mold 100 according to the present invention. The plaque 110 comprises a geometry composed of two long parts 122' having different diameters d1 and d2, wherein one of the long parts 122' additionally has different radii r1 and r2 at its outer edge. The plaque 110 illustrated in FIG. 7 forms a one-to-one pairing with a recess 104 (not illustrated), having a negative shape of the illustrated plaque shape.

FIG. 5 is a flow chart of the method 124 of manufacturing a tire mold 100 according to the present invention. The method comprises the following steps:
a) (denoted by reference number 126) providing an annular base part 102 comprising two or more recesses 104, wherein a first recess 106 of the two or more recesses 104 has a first recess shape S1 and a second recess 108 of the two or more recesses 104 has a second recess shape S1' different from the first recess shape S1, wherein at least one of the two or more recess shapes is asymmetric to a plane spanned by the central axis 116 of the annular base part 102 and a straight line perpendicular to the central axis 116 through the geometric center point 118 of the at least one of the two or more recess shapes;
b) (denoted by reference number 128) providing two or more plaques 110, wherein a first plaque 112 of the two or more plaques 110 has a first plaque shape S2 comprising a negative shape of the first recess shape S1, wherein a second plaque 114 of the two or more plaques 110 has a second plaque shape S2' comprising a negative shape of the second recess shape S1';

c) (denoted by reference number 130) inserting the two or more plaques 110 into their respective recesses 104 of the base part 102.

FIG. 6 is an enlarged front plane view of the plaque removing instrument 132 of a preferred embodiment of the molding kit according to the present invention. The plaque removing instrument 132 is configured for removing plaques 110 from the annular base part 102. For this purpose, the plaque removing instrument 132 may for example comprise a sharp tip 134 for piercing the plaque 104. Optionally, the plaque removing instrument 132 may further comprise a hook element 136 for an easy extraction of the pierced plaque 104. However, an extraction of the plaque 104 without the hook element 126 is also possible, for example by tilting the plaque removing instrument 132, preferably after piercing the plaque 104. The molding kit comprises the tire mold 100, at least one additional plaque 110 and the plaque removing instrument 132.

FIG. 7 is a front plane view of a preferred embodiment of a tire 138 cured in a tire mold 100 according to the present invention. The tire 138 has a tread 140 and a pair of sidewalls 142, wherein at least one sidewall 142 comprises markings 144 generated by the plaques 110 of the tire mold 100.

What is claimed is:

1. A tire mold for manufacturing at least one pneumatic tire, the tire mold comprising an annular base part comprising two or more recesses,
   wherein a first recess of the two or more recesses has a first recess shape S1 and
   wherein a second recess of the two or more recesses has a second recess shape S1' different from the first recess shape S1, and
   two or more plaques,
   wherein a first plaque of the two or more plaques has a first plaque shape S2 comprising a negative shape of the first recess shape S1, such that the first plaque is insertable into the first recess of the base part,
   wherein a second plaque of the two or more plaques has a second plaque shape S2' comprising a negative shape of the second recess shape S1', such that the second plaque is insertable into the second recess,
wherein at least one of the two or more recess shapes is asymmetric to a plane spanned by the central axis of the annular base part and a straight line perpendicular to the central axis through the geometric center point of the at least one of the two or more recess shapes, and
wherein at least one of the two or more recess shapes comprises a geometry composed of at least one hole and a long hole or of at least two long holes, wherein the holes all have different hole diameters.

2. The tire mold according to claim 1, wherein the at least one of the two or more recess shapes is further asymmetric in a plane through the geometric center point of the at least one of the two or more recess shapes and whose normal vector points along the straight line perpendicular to the central axis through the geometric center point.

3. The tire mold according to claim 1, wherein the number of the plaques equals the number of the recesses of the base part.

4. The tire mold according to claim 1, wherein the recess shapes of all of the two or more recess shapes differ from each other.

5. The tire mold according to claim 1, wherein each of the two or more recesses forms a one-to-one pairing with one of the two or more plaques.

6. The tire mold according to claim 5, wherein only in the pairing, the plaque shape and the recess shape are negatives of each other.

7. The tire mold according to claim 1, wherein the long holes are arched long holes.

8. The tire mold according to claim 1, wherein the long holes follow a curvature of the annular base part.

9. The tire mold according to claim 1, wherein the volume of each of the plaques is bigger than the volume of the recess the plaque is insertable into.

10. The tire mold according to claim 1, wherein the volume of each of the plaques is such that, when inserted into the recess of the base part, the plaque is within a clear dimension of the base part.

11. The tire mold according to claim 1, wherein the base part comprises one or more materials selected from the group consisting of steel, aluminum, copper and one or more of their alloys.

12. The tire mold according to claim 1, wherein at least one of the two or more plaques comprises one or more materials selected from the group consisting of steel, aluminum, copper and one or more of their alloys.

13. The tire mold according to claim 1, wherein the tire mold comprises at least 3 plaques and at least 3 recesses in the base part.

14. The tire mold according to claim 1, wherein in each recess, the base part comprises one or more extracting holes.

* * * * *